(12) United States Patent
Nakamura et al.

(10) Patent No.: US 12,362,391 B2
(45) Date of Patent: Jul. 15, 2025

(54) SECONDARY BATTERY

(71) Applicant: MURATA MANUFACTURING CO., LTD., Kyoto (JP)

(72) Inventors: Toshikazu Nakamura, Kyoto (JP); Tatsuya Kageyama, Kyoto (JP); Yusuke Wakata, Kyoto (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 495 days.

(21) Appl. No.: 17/994,842

(22) Filed: Nov. 28, 2022

(65) Prior Publication Data

US 2023/0099392 A1  Mar. 30, 2023

Related U.S. Application Data

(63) Continuation of application No. PCT/JP2021/017183, filed on Apr. 30, 2021.

(30) Foreign Application Priority Data

Jun. 2, 2020 (JP) ................................. 2020-096285

(51) Int. Cl.
*H01M 10/0525* (2010.01)
*H01M 4/62* (2006.01)
(Continued)

(52) U.S. Cl.
CPC ....... *H01M 10/0567* (2013.01); *H01M 4/622* (2013.01); *H01M 4/623* (2013.01);
(Continued)

(58) Field of Classification Search
CPC ........... H01M 10/052; H01M 10/0525; H01M 50/119
See application file for complete search history.

(56) References Cited

U.S. PATENT DOCUMENTS 10,290,899 B2 * 5/2019 Sugita ................... H01M 4/525
2004/0013946 A1 1/2004 Abe et al.
(Continued)

FOREIGN PATENT DOCUMENTS

JP 2004179146 A 6/2004
JP 2009158464 A 7/2009
(Continued)

OTHER PUBLICATIONS

International Search Report of corresponding PCT application PCT/JP2021/017183, dated Jul. 13, 2021.

*Primary Examiner* — Kevin E Yoon
(74) *Attorney, Agent, or Firm* — K&L Gates LLP

(57) ABSTRACT

A secondary battery includes an outer package member, a battery device, and a non-aqueous solution. The outer package member includes iron. The battery device and the non-aqueous solution are contained inside the outer package member. The battery device includes a positive electrode, a negative electrode, and an electrolytic solution. The positive electrode and the negative electrode are opposed to each other and are wound. The positive electrode and the negative electrode are each impregnated with the electrolytic solution. The negative electrode is electrically coupled to the outer package member, and includes at least one selected from the group consisting of polyvinylidene difluoride, a polyacrylic acid, a polyacrylic acid salt, polyacrylonitrile, and derivatives thereof. The non-aqueous solution is disposed in at least a portion of a space around the battery device inside the outer package member. The electrolytic solution and the non-aqueous solution each include a dinitrile compound. A content of the dinitrile compound in the electrolytic solution is less than 0.01 wt %. A content of the dinitrile compound in the non-aqueous solution is greater (Continued)

than or equal to 0.01 wt % and less than or equal to 0.1 wt %.

7 Claims, 2 Drawing Sheets

(51) Int. Cl.
    *H01M 10/0567*    (2010.01)
    *H01M 10/0587*    (2010.01)
    *H01M 50/119*    (2021.01)
    *H01M 4/02*    (2006.01)

(52) U.S. Cl.
    CPC ... *H01M 10/0525* (2013.01); *H01M 10/0587* (2013.01); *H01M 50/119* (2021.01); *H01M 2004/027* (2013.01); *H01M 2300/0025* (2013.01)

(56) References Cited

U.S. PATENT DOCUMENTS

| | | | |
|---|---|---|---|
| 2009/0197179 A1* | 8/2009 | Wakita | H01M 4/621 429/232 |
| 2013/0236757 A1* | 9/2013 | Tikhonov | H01M 10/0445 29/623.2 |
| 2015/0050562 A1 | 2/2015 | Abe et al. | |
| 2016/0336614 A1* | 11/2016 | Hatta | B60L 50/64 |

FOREIGN PATENT DOCUMENTS

| | | |
|---|---|---|
| JP | 2011070861 A | 4/2011 |
| JP | 2014150070 A | 8/2014 |
| JP | 2017103024 A | 6/2017 |
| WO | 2013141345 A1 | 9/2013 |
| WO | 2014156963 A1 | 10/2014 |

\* cited by examiner

SECONDARY BATTERY

CROSS REFERENCE TO RELATED APPLICATIONS

The present application is a continuation of PCT patent application No. PCT/JP2021/017183, filed on Apr. 30, 2021, which claims priority to Japanese patent application no. JP2020-096285, filed on Jun. 2, 2020, the entire contents of which are herein incorporated by reference.

BACKGROUND

The present technology relates to a secondary battery.

Various kinds of electronic equipment, including mobile phones, have been widely used. Such widespread use has promoted development of a secondary battery as a power source that is smaller in size and lighter in weight and allows for a higher energy density. The secondary battery includes a positive electrode, a negative electrode, and an electrolyte that are contained inside an outer package member. A configuration of the secondary battery has been considered in various ways.

Specifically, in order to improve a cyclability characteristic, a compound having two or more and four or less cyano groups in a structural formula is included in a non-aqueous electrolytic solution. In order to achieve a superior cyclability characteristic, succinonitrile is included in a non-aqueous electrolytic solution. In order to improve an electrochemical characteristic in a broad temperature range, a substance such as adiponitrile is included in a non-aqueous electrolytic solution. In order to achieve a superior cyclability characteristic, a nitrile compound such as a mononitrile compound or a dinitrile compound is included in a non-aqueous electrolytic solution.

SUMMARY

The present application relates to a secondary battery.

Consideration has been given in various ways to improve performance of a secondary battery; however, the secondary battery still remains insufficient in electrochemical durability and an electric resistance characteristic. Accordingly, there is still room for improvement in terms thereof.

The present technology has been made in view of such an issue and relates to providing a secondary battery that is able to achieve superior electrochemical durability and a superior electric resistance characteristic according to an embodiment.

A secondary battery according to an embodiment of the present technology includes an outer package member, a battery device, and a non-aqueous solution. The outer package member includes iron. The battery device and the non-aqueous solution are contained inside the outer package member. The battery device includes a positive electrode, a negative electrode, and an electrolytic solution. The positive electrode and the negative electrode are opposed to each other and are wound. The positive electrode and the negative electrode are each impregnated with the electrolytic solution. The negative electrode is electrically coupled to the outer package member, and includes at least one selected from the group consisting of polyvinylidene difluoride, a polyacrylic acid, a polyacrylic acid salt, polyacrylonitrile, and derivatives thereof. The non-aqueous solution is disposed in at least a portion of a space around the battery device inside the outer package member. The electrolytic solution and the non-aqueous solution each include a dinitrile compound. A content of the dinitrile compound in the electrolytic solution is less than 0.01 wt %. A content of the dinitrile compound in the non-aqueous solution is greater than or equal to 0.01 wt % and less than or equal to 0.1 wt %.

According to the secondary battery of an embodiment of the present technology, the outer package member including iron contains therein the battery device and the non-aqueous solution. The battery device includes: the negative electrode electrically coupled to the outer package member; and the electrolytic solution. The negative electrode includes, without limitation, polyvinylidene difluoride. The non-aqueous solution is disposed in the space around the battery device inside the outer package member. The content of the dinitrile compound in the electrolytic solution is less than 0.01 wt %. The content of the dinitrile compound in the non-aqueous solution is greater than or equal to 0.01 wt % and less than or equal to 0.1 wt %. Accordingly, it is possible to achieve superior electrochemical durability and a superior electric resistance characteristic.

Note that effects of the present technology are not necessarily limited to those described herein and may include any of a series of effects in relation to the present technology.

DETAILED DESCRIPTION

One or more embodiments of the present technology are described below in further detail including with reference to the drawings.

A description is given first of a secondary battery according to an embodiment of the present technology.

The secondary battery to be described here is a secondary battery that obtains a battery capacity using insertion and extraction of an electrode reactant, and includes a positive electrode, a negative electrode, and an electrolytic solution which is a liquid electrolyte. In the secondary battery, to prevent precipitation of the electrode reactant on a surface of the negative electrode during charging, a charge capacity of the negative electrode is greater than a discharge capacity of the positive electrode. In other words, an electrochemical capacity per unit area of the negative electrode is set to be greater than an electrochemical capacity per unit area of the positive electrode.

Although not particularly limited in kind, the electrode reactant is specifically a light metal such as an alkali metal or an alkaline earth metal. Examples of the alkali metal include lithium, sodium, and potassium. Examples of the alkaline earth metal include beryllium, magnesium, and calcium.

Examples are given below of a case where the electrode reactant is lithium. A secondary battery that obtains a battery capacity using insertion and extraction of lithium is a so-called lithium-ion secondary battery. In the lithium-ion secondary battery, lithium is inserted and extracted in an ionic state.

Figure 1:
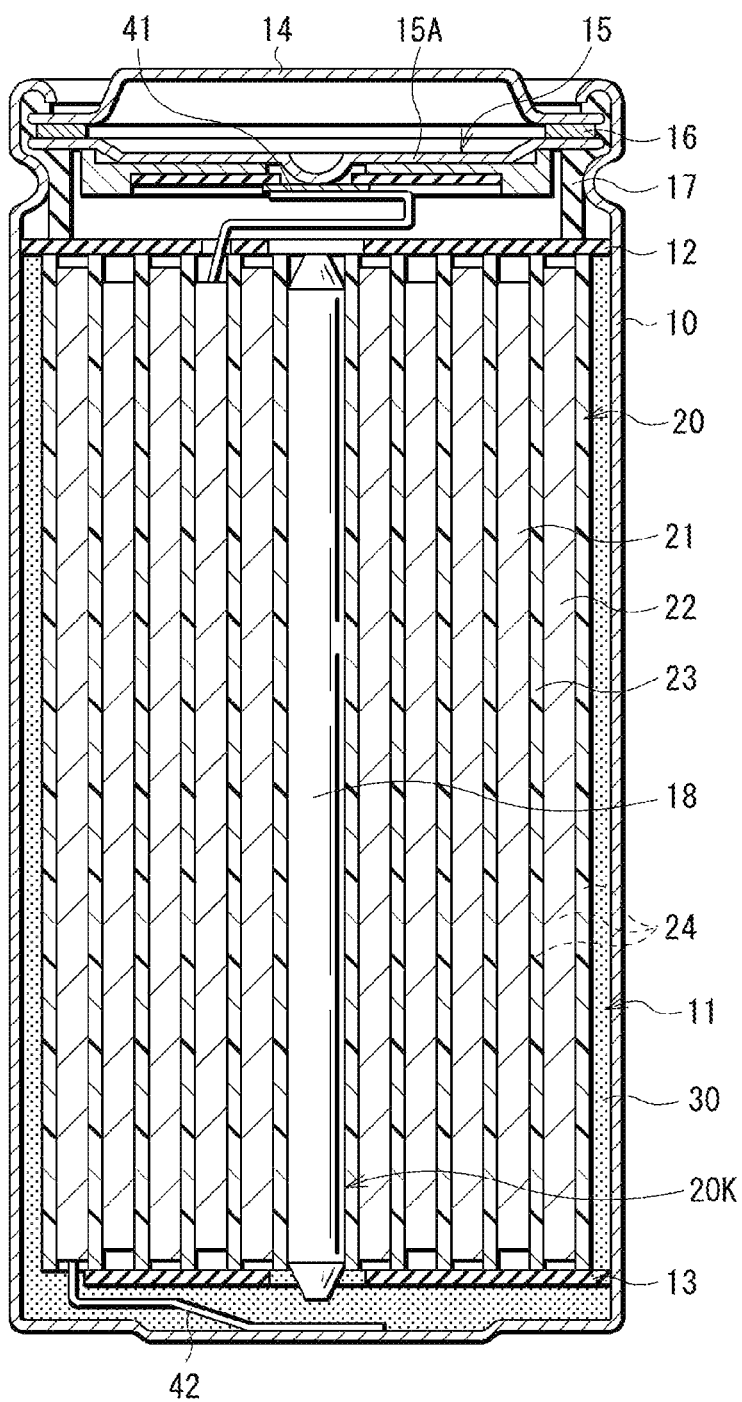
FIG. 1 is a sectional view of a configuration of a secondary battery according to an embodiment of the present technology.
Figure 2:
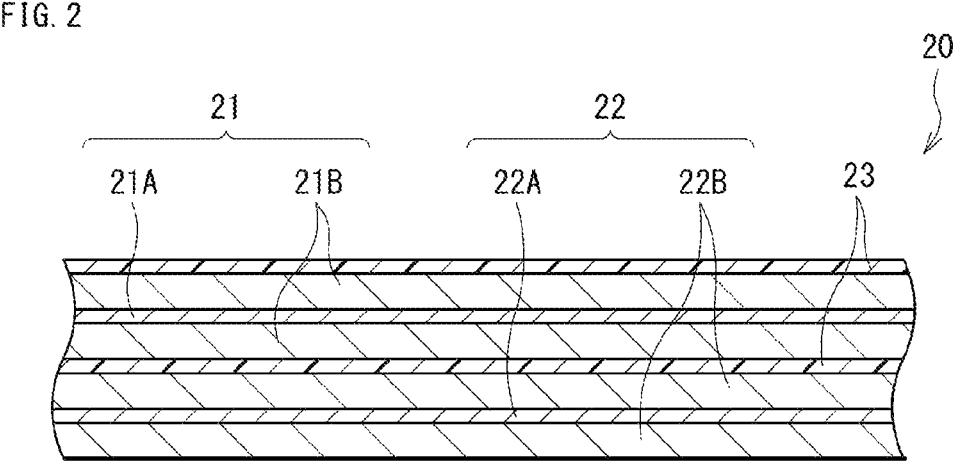
FIG. 2 is a sectional view of a configuration of a battery device illustrated in FIG. 1.

FIG. 1 illustrates a sectional configuration of the secondary battery. FIG. 2 illustrates a sectional configuration of a battery device 20 illustrated in FIG. 1. Note that FIG. 2 is an enlarged view of only a portion of the sectional configuration of the battery device 20.

As illustrated in FIGS. 1 and 2, the secondary battery includes an outer package can 10, the battery device 20, and a non-aqueous solution 30. The secondary battery to be described here is a secondary battery of a cylindrical type. The secondary battery of the cylindrical type includes the outer package can 10 that serves as an outer package member to contain the battery device 20. The outer package can 10 has rigidity.

Here, the secondary battery further includes a pair of insulating plates 12 and 13, a battery cover 14, a safety valve mechanism 15, a positive-temperature-coefficient (PTC) device 16 which is a thermosensitive resistive device, a gasket 17, a center pin 18, a positive electrode lead 41, and a negative electrode lead 42.

As illustrated in FIG. 1, the outer package can 10 is the outer package member to contain, for example, the battery device 20 and the non-aqueous solution 30. Here, the outer package can 10 has a cylindrical hollow structure with a closed end and an open end, and includes iron. In other words, the outer package can 10 is a metal can that includes iron. The outer package can 10 has a surface that may be plated with a metal material other than iron. Although not particularly limited in kind, the metal material is specifically, for example, nickel.

A volume of the outer package can 10 is larger than a volume of the battery device 20. Thus, the outer package can 10 has therein a gap 11 around the battery device 20. The gap 11 inside the outer package can 10 is a space which is not occupied by the battery device 20. The gap 11 is used for containing the non-aqueous solution 30 inside the outer package can 10.

A location where the gap 11 is provided (i.e., a range of provision of the gap 11) is not particularly limited as long as the location is a portion of or all of the space around the battery device 20. Here, the gap 11 is provided on a lateral side (around) and on a lower side of the battery device 20. In other words, the gap 11 includes a space between an inner wall surface of the outer package can 10 and a side surface of the battery device 20, and a space between a bottom surface of the outer package can 10 and a lower surface of the battery device 20.

The insulating plates 12 and 13 are contained inside the outer package can 10. The safety valve mechanism 15 and the PTC device 16 are each attached to the battery cover 14. The battery cover 14 is crimped to the outer package can 10 at the open end by means of the gasket 17. The open end of the outer package can 10 is thereby closed by the battery cover 14. The safety valve mechanism 15 includes a disk plate 15A.

The insulating plates 12 and 13 are disposed in such a manner as to be opposed to each other with the battery device 20 in between, and to sandwich the battery device 20 therebetween. The insulating plates 12 and 13 each extend in a direction intersecting a wound peripheral surface of the battery device 20 which is a wound electrode body. A detailed configuration of the battery device 20 which is the wound electrode body will be described later.

A material included in the battery cover 14 may be the same as a material included in the outer package can 10, or may be different from the material included in the outer package can 10. The safety valve mechanism 15 and the PTC device 16 are each attached to an inner side of the battery cover 14. The safety valve mechanism 15 is electrically coupled to the battery cover 14 via the PTC device 16.

In the safety valve mechanism 15, the disk plate 15A inverts when an internal pressure of the outer package can 10 reaches a certain level or higher, thereby cutting off the electrical coupling between the battery cover 14 and the battery device 20. Cases that cause the internal pressure of the outer package can 10 to reach the certain level or higher include, without limitation, a case where a short circuit occurs inside the secondary battery and a case where the secondary battery is heated from outside. The PTC device 16 involves an increase in electric resistance in accordance with a rise in temperature, in order to prevent abnormal heat generation resulting from a large current.

The gasket 17 includes an insulating material, and the insulating material is not particularly limited in kind. The gasket 17 may have a surface on which a material such as asphalt is applied. The center pin 18 is disposed in a winding center space 20K of the battery device 20 to be described later. Note, however, that the center pin 18 may be omitted. The presence or absence of the center pin 18 does not affect action and effects of the present technology to be described later, and thus the action and effects of the present technology are obtainable without the center pin 18.

As illustrated in FIGS. 1 and 2, the battery device 20 is an electric power generating device, and includes a positive electrode 21, a negative electrode 22, a separator 23, and an electrolytic solution 24. The battery device 20 is contained inside the outer package can 10. Note that FIG. 2 omits illustration of the electrolytic solution 24.

The battery device 20 is a so-called wound electrode body. That is, in the battery device 20, the positive electrode 21 and the negative electrode 22 are stacked on each other with the separator 23 interposed therebetween, and the stack of the positive electrode 21, the negative electrode 22, and the separator 23 is wound. Accordingly, the positive electrode 21 and the negative electrode 22 are opposed to each other with the separator 23 interposed therebetween, and are wound. The battery device 20 has, at the center thereof, the winding center space 20K in which the center pin 18 is to be disposed. The positive electrode 21, the negative electrode 22, and the separator 23 are each impregnated with the electrolytic solution 24.

How the positive electrode 21, the negative electrode 22, and the separator 23 are wound is not particularly limited. Here, the positive electrode 21, the negative electrode 22, and the separator 23 are wound in such a manner that the separator 23 is disposed in an outermost wind.

As illustrated in FIG. 2, the positive electrode 21 includes a positive electrode current collector 21A and a positive electrode active material layer 21B.

The positive electrode current collector 21A has two opposed surfaces on each of which the positive electrode active material layer 21B is to be provided. The positive electrode current collector 21A includes an electrically conductive material such as a metal material. Examples of the metal material include aluminum.

The positive electrode active material layer 21B is provided on each of the two opposed surfaces of the positive electrode current collector 21A. The positive electrode active material layer 21B includes one or more of positive electrode active materials into which lithium is insertable and from which lithium is extractable. Note that the positive electrode active material layer 21B may be provided on only one of the two opposed surfaces of the positive electrode current collector 21A. In addition, the positive electrode active material layer 21B may further include, for example, a positive electrode binder and a positive electrode conductor. A method of forming the positive electrode active material layer 21B is not particularly limited, and specifically includes, for example, a coating method.

The positive electrode active material includes a lithium compound. The term "lithium compound" is a generic term for a compound including lithium as a constituent element. More specifically, the lithium compound is a compound including lithium and one or more transition metal elements as constituent elements. A reason for this is that a high energy density is obtainable. Note that the lithium compound may further include one or more of other elements (excluding lithium and transition metal elements). Although not particularly limited in kind, the lithium compound is specifically, for example, an oxide, a phosphoric acid compound, a silicic acid compound, or a boric acid compound. Specific examples of the oxide include $LiNiO_2$, $LiCoO_2$, and $LiMn_2O_4$. Specific examples of the phosphoric acid compound include $LiFePO_4$ and $LiMnPO_4$.

The positive electrode binder includes one or more of materials including, without limitation, a synthetic rubber and a polymer compound. Examples of the synthetic rubber include a styrene-butadiene-based rubber. Examples of the polymer compound include polyvinylidene difluoride. The positive electrode conductor includes one or more of electrically conductive materials including, without limitation, a carbon material. Examples of the carbon material include graphite, carbon black, acetylene black, and Ketjen black. The electrically conductive material may be a metal material or a polymer compound, for example.

As illustrated in FIG. 2, the negative electrode 22 includes a negative electrode current collector 22A and a negative electrode active material layer 22B.

The negative electrode current collector 22A has two opposed surfaces on each of which the negative electrode active material layer 22B is to be provided. The negative electrode current collector 22A includes an electrically conductive material such as a metal material. Examples of the metal material include copper.

The negative electrode active material layer 22B is provided on each of the two opposed surfaces of the negative electrode current collector 22A. The negative electrode active material layer 22B includes one or more of negative electrode active materials into which lithium is insertable and from which lithium is extractable, and a negative electrode binder. Note that the negative electrode active material layer 22B may be provided on only one of the two opposed surfaces of the negative electrode current collector 22A. In addition, the negative electrode active material layer 22B may further include, for example, a negative electrode conductor. Details of the negative electrode conductor are similar to those of the positive electrode conductor. A method of forming the negative electrode active material layer 22B is not particularly limited, and specifically includes one or more of methods including, without limitation, a coating method, a vapor-phase method, a liquid-phase method, a thermal spraying method, and a firing (sintering) method.

The negative electrode active material includes a carbon material, a metal-based material, or both. A reason for this is that a high energy density is obtainable. Examples of the carbon material include graphitizable carbon, non-graphitizable carbon, and graphite (natural graphite and artificial graphite). The metal-based material is a material that includes, as a constituent element or constituent elements, one or more elements among metal elements and metalloid elements that are each able to form an alloy with lithium. Such metal elements and metalloid elements include silicon, tin, or both. The metal-based material may be a simple substance, an alloy, a compound, a mixture of two or more thereof, or a material including two or more phases thereof. Specific examples of the metal-based material include $TiSi_2$ and $SiO_x$ ($0<x\leq2$ or $0.2<x<1.4$).

The negative electrode binder includes one or more of polymer compounds. The polymer compounds are polyvinylidene difluoride, a polyacrylic acid, a polyacrylic acid salt, polyacrylonitrile, and derivatives thereof. The "derivative" means a compound into which any one or more functional groups are introduced. For example, a derivative of polyvinylidene difluoride is polyvinylidene difluoride into which any one or more functional groups are introduced.

In other words, the negative electrode binder includes the polymer compound such as polyvinylidene difluoride, and thus does not include the synthetic rubber such as the styrene-butadiene-based rubber. Accordingly, the negative electrode active material layer 22B does not include a thickener. The thickener is necessary for securing a coating property of a negative electrode mixture slurry in a case where the negative electrode binder includes the synthetic rubber. Examples of the thickener include carboxymethyl cellulose. A reason why the negative electrode active material layer 22B does not include the thickener is that an issue that the outer package can 10 dissolves due to a potential difference does not fundamentally occur in the case where the negative electrode binder includes the synthetic rubber, as will be described later. Details of the reason described here will be described later.

The separator 23 is an insulating porous film interposed between the positive electrode 21 and the negative electrode 22 as illustrated in FIG. 2, and allows lithium ions to pass therethrough while preventing contact (a short circuit) between the positive electrode 21 and the negative electrode 22. The separator 23 includes a polymer compound such as polyethylene.

The electrolytic solution 24 includes a solvent, an electrolyte salt, and one or more of dinitrile compounds.

The solvent includes one or more of non-aqueous solvents (organic solvents) including, without limitation, a carbonic-acid-ester-based compound, a carboxylic-acid-ester-based compound, and a lactone-based compound. An electrolytic solution including the non-aqueous solvent is a so-called non-aqueous electrolytic solution. Note that the dinitrile compound is excluded from the solvent described here. The electrolyte salt includes one or more of light metal salts including, without limitation, a lithium salt. Note that details of the dinitrile compound will be described later.

The electrolytic solution 24 includes a significantly small amount of dinitrile compound, and thus includes almost no dinitrile compound. Specifically, a content of the dinitrile compound in the electrolytic solution 24 is less than 0.01 wt %. A reason for this is that, although the non-aqueous solution 30 has to include a sufficient amount of dinitrile compound to fulfill a function of suppressing dissolution of the outer package can 10 electrically coupled to the negative electrode 22, as will be described later, the electrolytic solution 24 does not perform the above-described function of the non-aqueous solution 30 and thus may include substantially no dinitrile compound.

A procedure of examining the content of the dinitrile compound in the electrolytic solution 24 is as described below. First, the secondary battery that has been completed is disassembled to thereby collect the battery device 20. Thereafter, the separator 23 disposed in the outermost wind of the battery device 20 is cut to collect a portion of the separator 23. Thereafter, the electrolytic solution 24 with which the separator 23 is impregnated is extracted by centrifuging the separator 23 with use of a centrifuge (at a rotational speed of 3000 rpm for a processing time of 15 minutes). Lastly, the dinitrile compound included in the electrolytic solution 24 is quantitatively analyzed by gas chromatography mass spectrometry (GC/MS) to thereby measure the content (wt %) of the dinitrile compound in the electrolytic solution 24.

As illustrated in FIG. 1, the non-aqueous solution 30 is contained inside the outer package can 10, and more specifically, is disposed in the gap 11 inside the outer package can 10. The non-aqueous solution 30 may be disposed only in a portion of the gap 11 or may be disposed in the entire gap 11. Here, the non-aqueous solution 30 is disposed in the entire gap 11, and thus fills the gap 11. As a result, the non-aqueous solution 30 is in contact with the inner wall surface of the outer package can 10 and is also in contact with the side surface of the battery device 20. In FIG. 1, the non-aqueous solution 30 is shaded.

After assembly and before stabilization of the secondary battery, the non-aqueous solution 30 is used to suppress the dissolution of the outer package can 10 electrically coupled to the negative electrode 22 by increasing a rest potential (a potential of the battery device 20 in an uncharged state) of the outer package can 10, as will be described later.

The non-aqueous solution 30 thus includes one or more of dinitrile compounds together with a solvent. The term "dinitrile compound" is a generic term for a compound including two cyano groups.

However, unlike the electrolytic solution 24, the non-aqueous solution 30 includes a sufficient amount of dinitrile compound to exhibit the function of suppressing the dissolution of the outer package can 10 described above. Specifically, a content of the dinitrile compound in the non-aqueous solution 30 is within a range from 0.01 wt % to 0.1 wt % both inclusive. A reason for this is that the content of the dinitrile compound in the non-aqueous solution 30 is made appropriate, and this suppresses an increase in electric resistance of the secondary battery and also suppresses the dissolution of the outer package can 10.

A kind of the dinitrile compound included in the non-aqueous solution 30 may be the same as a kind of the nitrile compound included in the electrolytic solution 24, or may be different from the kind of the dinitrile compound included in the electrolytic solution 24.

The dinitrile compound is not particularly limited in kind as long as it is the compound including two cyano groups. In particular, the dinitrile compound is preferably a compound represented by Formula (1) below. The compound represented by Formula (1) is a chain compound having a cyano group at each of one end and the other end.

NC-R1-CN        (1)

where R1 is one selected from the group consisting of an alkylene group, an alkenylene group, an alkynylene group, a cycloalkylene group, an arylene group, and derivative groups thereof.

The alkylene group, the alkenylene group, the alkynylene group, the cycloalkylene group, and the arylene group are each not particularly limited in kind. The alkylene group, the alkenylene group, the alkynylene group, the cycloalkylene group, and the arylene group are each not particularly limited in carbon number. Note that the term "derivative group" is a generic term for a group in which one or more functional groups are introduced into any of the alkylene group, the alkenylene group, the alkynylene group, the cycloalkyl group, and the arylene group. Examples of the functional group include a hydroxyl group.

Examples of the compound in which R1 is the alkylene group include malononitrile (R1 is a methylene group), succinonitrile (R1 is an ethylene group), glutaronitrile (R1 is an n-propylene group), adiponitrile (R1 is an n-butylene group), and sebaconitrile (R1 is an n-octylene group).

Examples of the compound in which R1 is the arylene group include phthalonitrile (R1 is a phenylene group) and 4-hydroxyphthalonitrile (R1 is a hydroxyphenylene group which is a derivative group of the phenylene group). Note that the phenylene group may be an o-phenylene group, an m-phenylene group, or a p-phenylene group.

In particular, the dinitrile compound preferably includes succinonitrile. A reason for this is that succinonitrile is readily available and the dissolution of the outer package can 10 is sufficiently suppressed by making use of the non-aqueous solution 30.

Details of the solvent included in the non-aqueous solution 30 are similar to those of the solvent included in the electrolytic solution 24. A kind of the solvent included in the non-aqueous solution 30 may be the same as a kind of the solvent included in the electrolytic solution 24, or may be different from the kind of the solvent included in the electrolytic solution 24.

A procedure of examining the content of the dinitrile compound in the non-aqueous solution 30 is as described below. First, a hole is made through the bottom surface of the outer package can 10 using a tool such as a drill or a nail. Thereafter, the non-aqueous solution 30 dropping through the hole of the bottom surface of the outer package can 10 is collected by a polypropylene container with a lid by making use of a free-fall phenomenon. Lastly, the dinitrile compound included in the non-aqueous solution 30 is quantitatively analyzed by GC/MS to thereby measure the content (wt %) of the dinitrile compound in the non-aqueous solution 30.

The non-aqueous solution 30 may further include one or more of sulfur-oxygen-bonded-group-containing compounds. The term "sulfur-oxygen-bonded-group-containing compound" is a generic term for a compound including one or more sulfur-oxygen-bonded groups (S=O). A reason for this is that a potential of the negative electrode 22 is prevented from increasing easily, and this further suppresses the dissolution of the outer package can 10.

The sulfur-oxygen-bonded-group-containing compound is not particularly limited in kind, as long as it is the compound including one or more sulfur-oxygen-bonded groups. Specific examples of the sulfur-oxygen-bonded-group-containing compound include 1,3-propanesultone, methylpropanesultone, 1,3-propenesultone, ethylene sulfite, propargyl methanesulfonate, 1,4-butanesultone, and derivatives thereof. Details of the "derivative" are as described above. A content of the sulfur-oxygen-bonded-group-containing compound in the non-aqueous solution 30 is not particularly limited, and is preferably within a range from 0.01 wt % to 0.1 wt % both inclusive, in particular. A reason for this is that it is possible to sufficiently suppress the dissolution of the outer package can 10. A procedure of examining the content of the sulfur-oxygen-bonded-group-containing compound in the non-aqueous solution 30 is similar to the procedure of examining the content of the dinitrile compound in the non-aqueous solution 30.

In addition, the non-aqueous solution 30 may still further include one or more of electrolyte salts. In other words, the non-aqueous solution 30 may be a solution (an electrolytic solution) that plays a role that is substantially similar to that of the electrolytic solution 24. A reason for this is that: in a case where the battery device 20 (including the positive electrode 21, the negative electrode 22, and the separator 23) is impregnated with the non-aqueous solution 30, lithium ions easily moves through the non-aqueous solution 30; and this allows charging and discharging reactions to stably proceed by making use of the non-aqueous solution 30 which is an additional electrolytic solution even if the electrolytic solution 24 is consumed due to repeated charging and discharging. A content of the electrolyte salt in the non-aqueous solution 30 is not particularly limited, and may thus be set as desired.

Details of the electrolyte salt included in the non-aqueous solution 30 are similar to those of the electrolyte salt included in the electrolytic solution 24. A kind of the electrolyte salt included in the non-aqueous solution 30 may be the same as a kind of the electrolyte salt included in the electrolytic solution 24, or may be different from the kind of the electrolyte salt included in the electrolytic solution 24.

As illustrated in FIG. 1, the positive electrode lead 41 is a positive electrode wiring line coupled to the battery device 20 (the positive electrode 21). More specifically, the positive electrode lead 41 is coupled to the positive electrode current collector 21A. The positive electrode lead 41 includes an electrically conductive material such as aluminum, and is coupled to the battery cover 14 via the safety valve mechanism 15. The positive electrode 21 is thus electrically coupled to the battery cover 14 via the positive electrode lead 41.

As illustrated in FIG. 1, the negative electrode lead 42 is a negative electrode wiring line coupled to the battery device 20 (the negative electrode 22). More specifically, the negative electrode lead 42 is coupled to the negative electrode current collector 22A. The negative electrode lead 42 includes an electrically conductive material such as nickel, and is coupled to the outer package can 10. The negative electrode 22 is thus electrically coupled to the outer package can 10 via the negative electrode lead 42.

Upon charging the secondary battery, in the battery device 20, lithium is extracted from the positive electrode 21, and the extracted lithium is inserted into the negative electrode 22 via the electrolytic solution 24. Upon discharging the secondary battery, in the battery device 20, lithium is extracted from the negative electrode 22, and the extracted lithium is inserted into the positive electrode 21 via the electrolytic solution 24. Upon the charging and the discharging, lithium is inserted and extracted in an ionic state.

In the following, where appropriate, reference will be made to FIGS. 1 and 2 which have already been described.

The positive electrode active material is mixed with other materials including, without limitation, the positive electrode binder and the positive electrode conductor to thereby obtain a positive electrode mixture. Thereafter, the positive electrode mixture is put into a solvent such as an organic solvent to thereby prepare a paste positive electrode mixture slurry. Thereafter, the positive electrode mixture slurry is applied on the two opposed surfaces of the positive electrode current collector 21A to thereby form the positive electrode active material layers 21B. Thereafter, the positive electrode active material layers 21B may be compression-molded by means of, for example, a roll pressing machine. In this case, the positive electrode active material layers 21B may be heated. The positive electrode active material layers 21B may be compression-molded multiple times. The positive electrode 21 is thus fabricated.

The negative electrode 22 is fabricated by a procedure similar to the fabrication procedure of the positive electrode 21 described above. Specifically, a paste negative electrode mixture slurry including an organic solvent and a negative electrode mixture (a mixture of the negative electrode active material and other materials including, without limitation, the negative electrode binder and the negative electrode conductor) is prepared, following which the negative electrode active material layers 22B are formed on the respective two opposed surfaces of the negative electrode current collector 22A using the negative electrode mixture slurry. Thereafter, the negative electrode active material layers 22B may be compression-molded. The negative electrode 22 is thus fabricated.

The electrolyte salt is put into the solvent, following which the dinitrile compound is added to the solvent. The electrolyte salt and the dinitrile compound are thereby each dispersed or dissolved in the solvent. As a result, the electrolytic solution 24 is prepared. In this case, an addition amount of the dinitrile compound is adjusted in such a manner that the content of the dinitrile compound in the electrolytic solution 24 is less than 0.01 wt %.

In preparing the electrolytic solution 24, it is not necessary to add the dinitrile compound to the solvent. In this case, after the secondary battery is completed, the battery device 20 (including the positive electrode 21, the negative electrode 22, and the separator 23) is impregnated with a portion of the dinitrile compound included in the non-aqueous solution 30. Thus, even if no dinitrile compound is included in the prepared electrolytic solution 24, the dinitrile compound will be included in the electrolytic solution 24 in the completed secondary battery.

However, due to the fact that the positive electrode 21 and the negative electrode 22 are wound with the separator 23 interposed therebetween, and that the positive electrode 21, the negative electrode 22, and the separator 23 are closely attached to each other, an amount of the non-aqueous solution 30 with which the battery device 20 (including the positive electrode 21, the negative electrode 22, and the separator 23) is to be impregnated is suppressed to be significantly low. Thus, even if the battery device 20 is impregnated with the non-aqueous solution 30, the content of the dinitrile compound in the electrolytic solution 24 will be less than 0.01 wt %, as described above.

The dinitrile compound is put into the solvent. The dinitrile compound is thereby dispersed or dissolved in the solvent. As a result, the non-aqueous solution 30 is prepared. In this case, an addition amount of the dinitrile compound is adjusted in such a manner that the content of the dinitrile compound in the non-aqueous solution 30 is within the range from 0.01 wt % to 0.1 wt %.

In preparing the non-aqueous solution 30, the sulfur-oxygen-bonded-group-containing compound may further be added to the solvent, and the electrolyte salt may still further be added to the solvent, as described above.

First, the positive electrode lead 41 is coupled to the positive electrode 21 (the positive electrode current collector 21A) by a method such as a welding method, and the negative electrode lead 42 is coupled to the negative electrode 22 (the negative electrode current collector 22A) by a method such as a welding method. Although not particularly limited in kind, the welding method is specifically a method such as a resistance welding method. The details of the welding method described here apply also to the description below.

Thereafter, the positive electrode 21 and the negative electrode 22 are stacked on each other with the separator 23 interposed therebetween, following which the stack of the positive electrode 21, the negative electrode 22, and the separator 23 is wound to thereby fabricate a wound body having the winding center space 20K. The wound body has a configuration similar to that of the battery device 20 except that the positive electrode 21, the negative electrode 22, and the separator 23 are each not impregnated with the electrolytic solution 24. Thereafter, the center pin 18 is disposed in the winding center space 20K of the wound body.

Thereafter, the wound body to which the positive electrode lead 41 and the negative electrode lead 42 are each coupled is immersed in the electrolytic solution 24. In this case, a container is filled with the electrolytic solution 24, following which the wound body is put into the electrolytic solution 24 in such a manner that the entire wound body is immersed. The positive electrode 21, the negative electrode 22, and the separator 23 are thereby each impregnated with the electrolytic solution 24. The battery device 20 which is the wound electrode body is thus fabricated. Thereafter, the battery device 20 is taken out from the container (the electrolytic solution 24), following which the electrolytic solution 24 attached to each of the positive electrode lead 41 and the negative electrode lead 42 is wiped off.

Thereafter, the battery device 20 is interposed between the pair of insulating plates 12 and 13, and the battery device 20 in that state is placed into the outer package can 10 together with the insulating plates 12 and 13 through the open end, following which the battery cover 14 to which the safety valve mechanism 15 and the PTC device 16 are each attached is disposed on the open end of the outer package can 10. In this case, the positive electrode lead 41 is coupled to the safety valve mechanism 15 by a method such as a welding method, and the negative electrode lead 42 is coupled to the outer package can 10 by a method such as a welding method.

Thereafter, the non-aqueous solution 30 is injected through the open end into the outer package can 10 inside which the battery device 20 is contained. The non-aqueous solution 30 is thus disposed in the gap 11 provided inside the outer package can 10.

Lastly, the battery cover 14 is crimped to the outer package can 10 at the open end by means of the gasket 17 to thereby fix the battery cover 14, together with the safety valve mechanism 15 and the PTC device 16, to the outer package can 10. Thus, the battery device 20 and the non-aqueous solution 30 are each sealed inside the outer package can 10. As a result, the secondary battery is assembled.

The secondary battery after being assembled is charged and discharged. Various conditions including, for example, an environment temperature, the number of times of charging and discharging (the number of cycles), and charging and discharging conditions, may be set as desired.

This process forms a film on a surface of, for example, the negative electrode 22. This brings the secondary battery into an electrochemically stable state. The secondary battery including the outer package can 10, that is, the secondary battery of the cylindrical type, is thus completed.

According to the secondary battery, the outer package can 10 including iron contains therein the battery device 20 and the non-aqueous solution 30. The battery device 20 includes: the negative electrode 22 electrically coupled to the outer package can 10; and the electrolytic solution 24. The negative electrode 22 includes, without limitation, polyvinylidene difluoride. The non-aqueous solution 30 is disposed in the gap 11 around the battery device 20 inside the outer package can 10. The content of the dinitrile compound in the electrolytic solution 24 is less than 0.01 wt %. The content of the dinitrile compound in the non-aqueous solution 30 is greater than or equal to 0.01 wt % and less than or equal to 0.1 wt %. Accordingly, it is possible to achieve superior electrochemical durability and a superior electric resistance characteristic for reasons described below.

A secondary battery according to a comparative example for the secondary battery of an embodiment has a configuration similar to the configuration of the secondary battery according to an embodiment except for including no non-aqueous solution 30. That is, in the secondary battery according to the comparative example, the negative electrode 22 includes, as the negative electrode binder, the polymer compound such as polyvinylidene difluoride, similarly to the secondary battery according to an embodiment.

In the secondary battery according to the comparative example, a potential of the negative electrode 22 increases during a certain period after the assembly (after the negative electrode 22 coupled to the outer package can 10 is impregnated with the electrolytic solution 24) and before the stabilization (before the charging and discharging for bringing the secondary battery into the electrochemically stable state). In this case, the rest potential of the outer package can 10 becomes lower than the potential of the negative electrode 22. Thus, a difference (a potential difference) between the rest potential of the outer package can 10 and the potential of the negative electrode 22 increases. This causes the outer package can 10 to electrochemically corrode easily, and thus causes the outer package can 10 to dissolve easily. This also causes a dissolved substance of the outer package can 10 to be generated easily, and thus causes the electric resistance of the secondary battery to increase easily. Accordingly, it is difficult to achieve superior electrochemical durability and a superior electric resistance characteristic.

In contrast, in the secondary battery according to an embodiment, the non-aqueous solution 30 is disposed in the gap 11 inside the outer package can 10, that is, the non-aqueous solution 30 including the dinitrile compound is in contact with each of the outer package can 10 and the battery device 20. In this case, even if the potential of the negative electrode 22 increases during the certain period after the assembly and before the stabilization, the rest potential of the outer package can 10 also increases due to the presence of the non-aqueous solution 30. Thus, the above-described potential difference decreases. This prevents the outer package can 10 from electrochemically corroding easily, and thus prevents the outer package can 10 from dissolving easily. This also prevents the dissolved substance of the outer package can 10 from being generated easily, and thus prevents the electric resistance of the secondary battery from increasing easily. Accordingly, it is possible to achieve superior electrochemical durability and a superior electric resistance characteristic.

In particular, in the secondary battery according to the present embodiment, the negative electrode 22 may include no carboxymethyl cellulose which is the thickener. This causes the issue that the outer package can 10 dissolves due to the potential difference to easily occur substantially. It is possible to effectively suppress the dissolution of the outer package can 10.

In more detail, whether the potential of the negative electrode 22 increases during the certain period after the assembly and before the stabilization depends on a kind of the negative electrode binder (i.e., presence or absence of the thickener) included in the negative electrode 22.

In a case where the negative electrode 22 includes, as the negative electrode binder, the polymer compound such as polyvinylidene difluoride, and thus includes no carboxymethyl cellulose which is the thickener, the potential of the negative electrode 22 increases easily during the certain period after the assembly and before the stabilization, as described above. Accordingly, the issue related to the dissolution of the outer package can 10 caused by the potential difference easily occurs fundamentally.

In contrast, in a case where the negative electrode 22 includes, as the negative electrode binder, the synthetic rubber such as the styrene-butadiene-based rubber, and thus includes carboxymethyl cellulose which is the thickener, the potential of the negative electrode 22 is prevented from increasing easily during the certain period after the assembly and before the stabilization. Accordingly, the issue related to the dissolution of the outer package can 10 caused by the potential difference is prevented from easily occurring fundamentally.

Taking the above into consideration, in the case where the negative electrode 22 includes, as the negative electrode binder, the synthetic rubber such as the styrene-butadiene-based rubber, and also includes carboxymethyl cellulose which is the thickener, the potential of the negative electrode 22 is prevented from easily increasing originally during the certain period after the assembly and before the stabilization. Accordingly, it is possible to suppress the dissolution of the outer package can 10 caused by the potential difference without taking the trouble of using the non-aqueous solution 30.

In contrast, in the case where the negative electrode 22 includes, as the negative electrode binder, the polymer compound such as polyvinylidene difluoride, and also includes no carboxymethyl cellulose which is the thickener, the potential of the negative electrode 22 easily increases originally during the certain period after the assembly and before the stabilization. To address this, the non-aqueous solution 30 is used, which makes it possible to suppress the dissolution of the outer package can 10 caused by the potential difference.

In addition, the dinitrile compound may include, without limitation, succinonitrile. A reason for this is that the dinitrile compound is readily available and it is possible to sufficiently suppress the dissolution of the outer package can 10 by making use of the non-aqueous solution 30. Accordingly, it is possible to achieve higher effects.

In addition, the non-aqueous solution 30 may further include the sulfur-oxygen-bonded-group-containing compound. This further increases the rest potential of the outer package can 10 electrically coupled to the negative electrode 22. The dissolution of the outer package can 10 is thus further suppressed. Accordingly, it is possible to achieve higher effects.

In addition, the non-aqueous solution 30 may further include the electrolyte salt. This allows charging and discharging reactions to stably proceed easily by making use of the non-aqueous solution 30 which is the additional electrolytic solution. Accordingly, it is possible to achieve higher effects.

In addition, the secondary battery may include a lithium-ion secondary battery. This makes it possible to obtain a sufficient battery capacity stably through the use of insertion and extraction of lithium. Accordingly, it is possible to achieve higher effects.

The configuration of the secondary battery described above is appropriately modifiable as described below according to an embodiment. Note that any two or more of the following series of modifications may be combined with each other.

The separator 23 having a single-layer structure configured by a porous film is used. However, although not specifically illustrated here, the separator 23 having a multilayer structure (i.e., the separator 23 of a stacked type) including a polymer compound layer may be used instead of the single-layer separator 23.

Specifically, the separator 23 of the stacked type includes a porous layer (a porous film) having two opposed surfaces, and a polymer compound layer disposed on one of or each of the two opposed surfaces of the porous layer. A reason for this is that adherence of the separator 23 to each of the positive electrode 21 and the negative electrode 22 improves to suppress the occurrence of winding displacement of the battery device 20. This helps to prevent the secondary battery from easily swelling even if, for example, a decomposition reaction of the electrolytic solution occurs. The polymer compound layer includes a polymer compound such as polyvinylidene difluoride which has superior physical strength and is electrochemically stable.

Note that the porous layer, the polymer compound layer, or both may each include one or more kinds of insulating particles. A reason for this is that the insulating particles dissipate heat upon heat generation by the secondary battery, thus improving safety or heat resistance of the secondary battery. Examples of the insulating particles include inorganic particles and resin particles. Specific examples of the inorganic particles include particles of: aluminum oxide, aluminum nitride, boehmite, silicon oxide, titanium oxide, magnesium oxide, and zirconium oxide. Specific examples of the resin particles include particles of acrylic resin and particles of styrene resin.

In a case of fabricating the separator 23 of the stacked type, a polymer compound solution including, without limitation, the polymer compound and an organic solvent is prepared, following which the polymer compound solution is applied on one of or each of the two opposed surfaces of the porous layer. In another example, the porous layer may be immersed in the polymer compound solution. In this case, the insulating particles may be added to the polymer compound solution on an as-needed basis.

In the case where the separator 23 of the stacked type is used also, lithium ions are movable between the positive electrode 21 and the negative electrode 22, and similar effects are therefore obtainable.

The electrolytic solution 24 which is a liquid electrolyte is used. However, although not specifically illustrated here, an electrolyte layer which is a gel electrolyte may be used instead of the electrolytic solution 24.

In the battery device 20 including the electrolyte layer, the positive electrode 21 and the negative electrode 22 are wound with the separator 23 and the electrolyte layer interposed therebetween. The electrolyte layer is interposed between the positive electrode 21 and the separator 23, and between the negative electrode 22 and the separator 23.

Specifically, the electrolyte layer includes a polymer compound together with the electrolytic solution 24. The electrolytic solution 24 is held by the polymer compound in the electrolyte layer. A reason for this is that leakage of the electrolytic solution 24 is prevented. The configuration of the electrolytic solution 24 is as described above. The polymer compound includes, for example, polyvinylidene difluoride. In a case of forming the electrolyte layer, an electrolyte solution including, for example, the electrolytic solution 24, the polymer compound, and an organic solvent is prepared, following which the electrolyte solution is applied on one side or both sides of the positive electrode 21 and on one side or both sides of the negative electrode 22.

In a case where the electrolyte layer is used also, lithium ions are movable between the positive electrode 21 and the negative electrode 22 via the electrolyte layer, and similar effects are therefore obtainable.

Applications (application examples) of the secondary battery are not particularly limited. The secondary battery used as a power source may serve as a main power source or an auxiliary power source of, for example, electronic equipment and an electric vehicle. The main power source is preferentially used regardless of the presence of any other power source. The auxiliary power source is used in place of the main power source, or is switched from the main power source.

Specific examples of the applications of the secondary battery include: electronic equipment; apparatuses for data storage; electric power tools; battery packs to be mounted on, for example, electronic equipment; medical electronic equipment; electric vehicles; and electric power storage systems. Examples of the electronic equipment include video cameras, digital still cameras, mobile phones, laptop personal computers, headphone stereos, portable radios, and portable information terminals. Examples of the apparatuses for data storage include backup power sources and memory cards. Examples of the electric power tools include electric drills and electric saws. Examples of the medical electronic equipment include pacemakers and hearing aids. Examples of the electric vehicles include electric automobiles including hybrid automobiles. Examples of the electric power storage systems include home battery systems or industrial battery systems for accumulation of electric power for a situation such as emergency. The above-described applications may each use one secondary battery, or may each use multiple secondary batteries.

The battery packs may each include a single battery, or may each include an assembled battery. The electric vehicle is a vehicle that operates (travels) using the secondary battery as a driving power source, and may be a hybrid automobile that is additionally provided with a driving source other than the secondary battery. In an electric power storage system for home use, electric power accumulated in the secondary battery which is an electric power storage source may be utilized for using, for example, home appliances.

An application example of the secondary battery will now be described in detail. The configuration of the application example described below is merely an example, and is appropriately modifiable.

Figure 3:
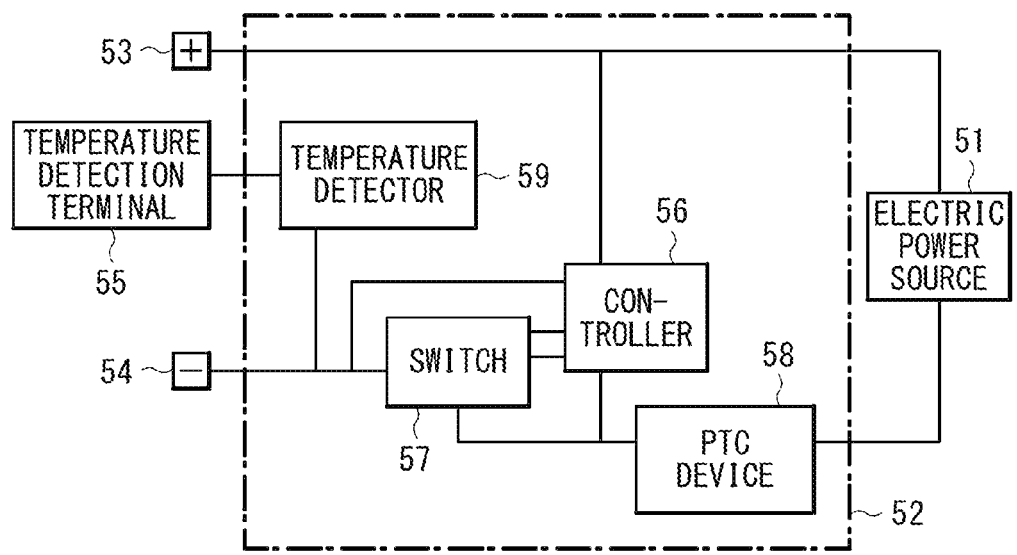
FIG. 3 is a block diagram illustrating a configuration of an application example of the secondary battery.

FIG. 3 illustrates a block configuration of a battery pack. The battery pack described here is a battery pack (a so-called soft pack) including one secondary battery, and is to be mounted on, for example, electronic equipment typified by a smartphone.

As illustrated in FIG. 3, the battery pack includes an electric power source 51 and a circuit board 52. The circuit board 52 is coupled to the electric power source 51, and includes a positive electrode terminal 53, a negative electrode terminal 54, and a temperature detection terminal 55.

The electric power source 51 includes one secondary battery. The secondary battery has a positive electrode lead coupled to the positive electrode terminal 53 and a negative electrode lead coupled to the negative electrode terminal 54. The electric power source 51 is couplable to outside via the positive electrode terminal 53 and the negative electrode terminal 54, and is thus chargeable and dischargeable. The circuit board 52 includes a controller 56, a switch 57, a PTC device 58, and a temperature detector 59. However, the PTC device 58 may be omitted.

The controller 56 includes, for example, a central processing unit (CPU) and a memory, and controls an overall operation of the battery pack. The controller 56 detects and controls a use state of the electric power source 51 on an as-needed basis.

If a voltage of the electric power source 51 (the secondary battery) reaches an overcharge detection voltage or an overdischarge detection voltage, the controller 56 turns off the switch 57. This prevents a charging current from flowing into a current path of the electric power source 51. The overcharge detection voltage and the overdischarge detection voltage are not particularly limited. For example, the overcharge detection voltage is 4.2 V±0.05 V and the overdischarge detection voltage is 2.4 V±0.1 V.

The switch 57 includes, for example, a charge control switch, a discharge control switch, a charging diode, and a discharging diode. The switch 57 performs switching between coupling and decoupling between the electric power source 51 and external equipment in accordance with an instruction from the controller 56. The switch 57 includes, for example, a metal-oxide-semiconductor field-effect transistor (MOSFET). The charging and discharging currents are detected on the basis of an ON-resistance of the switch 57.

The temperature detector 59 includes a temperature detection device such as a thermistor. The temperature detector 59 measures a temperature of the electric power source 51 using the temperature detection terminal 55, and outputs a result of the temperature measurement to the controller 56. The result of the temperature measurement to be obtained by the temperature detector 59 is used, for example, in a case where the controller 56 performs charge/discharge control upon abnormal heat generation or in a case where the controller 56 performs a correction process upon calculating a remaining capacity.

EXAMPLES

A description is given of Examples of the present technology below according to an embodiment.

Examples 1 to 10 and Comparative Examples 1 to 4

Secondary batteries were fabricated, following which the secondary batteries were each evaluated for their performance. Note that, in Table 1, Examples 1 to 10 are respectively presented as "E1 to E10" and Comparative examples 1 to 4 are respectively presented as "C1 to C4" to simplify the presented contents.

[Fabrication of Secondary Battery]

The secondary batteries of the cylindrical type (the lithium-ion secondary batteries) illustrated in FIGS. 1 and 2 were each fabricated by the following procedure.

(Fabrication of Positive Electrode)

First, 91 parts by mass of the positive electrode active material ($LiCoO_2$), 3 parts by mass of the positive electrode binder (polyvinylidene difluoride), and 6 parts by mass of the positive electrode conductor (graphite) were mixed with each other to thereby obtain a positive electrode mixture. Thereafter, the positive electrode mixture was put into an organic solvent (N-methyl-2-pyrrolidone), following which the organic solvent was stirred to thereby prepare a paste positive electrode mixture slurry. Thereafter, the positive electrode mixture slurry was applied on the two opposed surfaces of the positive electrode current collector 21A (a band-shaped aluminum foil having a thickness of 12 µm) by means of a coating apparatus, following which the applied positive electrode mixture slurry was dried to thereby form the positive electrode active material layers 21B. Lastly, the positive electrode active material layers 21B were compression-molded by means of a roll pressing machine. The positive electrode 21 was thus fabricated.

Note that, in the case of fabricating the positive electrode 21, no positive electrode active material layer 21B was formed on each of one end and the other end of the positive electrode current collector 21A, and the one end and the other end of the positive electrode current collector 21A were each exposed.

(Fabrication of Negative Electrode)

In a case of preparing a negative electrode mixture slurry using a water-based solvent (an aqueous solvent), the negative electrode 22 was fabricated by the following procedure.

First, 95 parts by mass of the negative electrode active material, 3 parts by mass of the negative electrode binder (a polyacrylic acid salt (PALT) which is the polymer compound), and 2 parts by mass of the negative electrode conductor (carbon black) were mixed with each other, to thereby obtain a negative electrode mixture. As the negative electrode active material, a mixture of the carbon material (graphite) and the metal-based material (SiO) was used, and a mixture ratio (a weight ratio) between the carbon material and the metal-based material was as listed in Table 1. Thereafter, the negative electrode mixture was put into an aqueous solvent (pure water), following which the organic solvent was stirred to thereby prepare a paste negative electrode mixture slurry. Thereafter, the negative electrode mixture slurry was applied on the two opposed surfaces of the negative electrode current collector 22A (a band-shaped copper foil having a thickness of 15 μm) by means of a coating apparatus, following which the applied negative electrode mixture slurry was dried to thereby form the negative electrode active material layers 22B. Lastly, the negative electrode active material layers 22B were compression-molded by means of the roll pressing machine. The negative electrode 22 was thus fabricated.

In a case of preparing the negative electrode mixture slurry using an organic-solvent-based solvent (an organic solvent), the negative electrode 22 (including the negative electrode current collector 22A and the negative electrode active material layer 22B) was fabricated by a similar procedure except that: polyvinylidene difluoride (PVDF), instead of the polyacrylic acid salt, was used as the negative electrode binder; and the organic solvent (N-methyl-2-pyrrolidone (NMP)), instead of the aqueous solvent, was used as the solvent for preparing the negative electrode mixture slurry.

Note that, in the case of fabricating the negative electrode 22, no negative electrode active material layer 22B was formed on each of one end and the other end of the negative electrode current collector 22A, and the one end and the other end of the negative electrode current collector 22A were each exposed.

(Preparation of Electrolytic Solution)

The electrolyte salt (LiPF$_6$) was added to the solvent (ethylene carbonate and diethyl carbonate), following which the solvent was stirred. In this case, a mixture ratio (a weight ratio) between ethylene carbonate and diethyl carbonate in the solvent was set to 30:70, and a content of the electrolyte salt was set to 1 mol/kg with respect to the solvent. The electrolytic solution 24 was thus prepared.

(Preparation of Non-Aqueous Solution)

Here, the non-aqueous solution 30 which was the electrolytic solution was prepared. In this case, the electrolyte salt was added to the solvent and the solvent was stirred, following which the dinitrile compound (succinonitrile (SN)) was further added to the stirred solvent and the solvent was stirred again. A kind and a composition of the solvent and a kind and a content of the electrolyte salt were respectively similar to the kind and the composition of the solvent and the kind and the content of the electrolyte salt included in the electrolytic solution 24. The non-aqueous solution 30 was thus prepared.

Note that, in the case of preparing the non-aqueous solution 30, the sulfur-oxygen-bonded-group-containing compound (methylpropanesultone (PMS)) was further added to the solvent on an as-needed basis.

(Assembly of Secondary Battery)

First, by a resistance welding method, the positive electrode lead 41 including aluminum was welded to the positive electrode 21 (the positive electrode current collector 21A) and the negative electrode lead 42 including nickel was welded to the negative electrode 22 (the negative electrode current collector 22A).

Thereafter, the positive electrode 21 and the negative electrode 22 were stacked on each other with the separator 23 (a biaxially oriented polyethylene film having a thickness of 10 μm) interposed therebetween, following which the stack of the positive electrode 21, the negative electrode 22, and the separator 23 was wound to thereby fabricate the wound body having the winding center space 20K. Thereafter, the center pin 18 was disposed in the winding center space 20K of the wound body.

Thereafter, a container was filled with the electrolytic solution 24, following which the wound body to which the positive electrode lead 41 and the negative electrode lead 42 were each coupled was immersed in the electrolytic solution 24 (for an immersion time of 12 hours). The positive electrode 21, the negative electrode 22, and the separator 23 were thereby each impregnated with the electrolytic solution 24. The battery device 20 which was the wound electrode body was thus fabricated. Thereafter, the battery device 20 was taken out from the container (the electrolytic solution 24), and the battery device 20 was dried.

Thereafter, the wound body was interposed between the pair of insulating plates 12 and 13, and the wound body in that state was placed into the outer package can 10 together with the insulating plates 12 and 13 through the open end. The outer package can 10 included iron and was plated with nickel. Thereafter, the battery cover 14 (together with the safety valve mechanism 15 and the PTC device 16) was disposed on the open end of the outer package can 10. In this case, the positive electrode lead 41 was welded to the safety valve mechanism 15 by a resistance welding method, and the negative electrode lead 42 was welded to the outer package can 10 by a resistance welding method. Thereafter, the non-aqueous solution 30 was injected into the outer package can 10 to thereby dispose the non-aqueous solution 30 in the gap 11 inside the outer package can 10.

Lastly, the battery cover 14 was crimped to the outer package can 10 at the open end by means of the gasket 17 (a polybutylene terephthalate (PBT) film having a thickness of 1.5 mm) to thereby fix the battery cover 14 (together with the safety valve mechanism 15 and the PTC device 16) to the open end of the outer package can 10. The battery device 20 and the non-aqueous solution 30 were each sealed inside the outer package can 10. As a result, the secondary battery was assembled.

(Stabilization of Secondary Battery)

After 12 hours had elapsed from the assembly of the secondary battery, the secondary battery was charged and discharged for one cycle in an ambient temperature environment (at a temperature of 25° C.). Upon the charging, the secondary battery was charged with a constant current of 0.1 C until a voltage reached 4.2 V, and was thereafter charged with a constant voltage of 4.2 V until a current reached 0.05 C. Upon the discharging, the secondary battery was discharged with a constant current of 0.1 C until the voltage reached 3.0 V. Note that 0.1 C is a value of a current that causes a battery capacity (a theoretical capacity) to be completely discharged in 10 hours, and 0.05 C is a value of a current that causes the battery capacity to be completely discharged in 20 hours.

In this manner, a film was formed on the surface of, for example, the negative electrode 22, and the state of the secondary battery was thus electrochemically stabilized. As a result, the secondary battery of the cylindrical type was completed.

After the secondary battery was completed, the content (wt %) of the dinitrile compound in the electrolytic solution 24, the content (wt %) of the dinitrile compound in the non-aqueous solution 30, and the content (wt %) of the sulfur-oxygen-bonded-group-containing compound in the non-aqueous solution 30 were examined. The results thereof were as listed in Table 1.

Evaluation of performance (the electrochemical durability and the electric resistance characteristic) of the secondary batteries revealed the results presented in Table 1.

In a case of evaluating the electrochemical durability, first, the secondary battery was charged in an ambient temperature environment (at a temperature of 25° C.). In this case, the secondary battery was charged with a constant current of 1 C until a voltage reached 4.2 V, and was thereafter charged with a constant voltage of 4.2 V until a current reached 10 mA. Note that 1 C is a value of a current that causes the battery capacity to be completely discharged in 1 hour. Thereafter, the charged secondary battery was disassembled to thereby collect the outer package can 10. Lastly, the inner wall surface of the outer package can 10 was examined to thereby check whether dissolution of the outer package can 10 had occurred. In this case, the inner wall surface of the outer package can 10 was visually observed, and, on an as-needed basis, the inner wall surface of the outer package can 10 was observed with use of a digital microscope.

In the column of "can dissolution" in Table 1, "yes" is written in a case where the dissolution of the outer package can 10 occurred (including a case where a color of the inner wall surface of the outer package can 10 was changed), and "no" is written in a case where the dissolution of the outer package can 10 did not occur.

In a case of evaluating the electric resistance characteristic, the electric resistance (impedance at 1 kHz alternating current (mΩ)) of the secondary battery was measured in a period after the assembly and before the stabilization to thereby examine whether the electric resistance had increased. In this case, a secondary battery including the non-aqueous solution 30 that did not include the dinitrile compound (succinonitrile) was assembled to thereby examine an electric resistance (a reference electric resistance) of the assembled secondary battery, following which whether the electric resistance measured in the period after the assembly and before the stabilization had increased as compared with the reference electric resistance was determined.

In the column of "resistance increase" in Table 1, "yes" is written in a case where an amount of increase in the electric resistance was greater than or equal to 0.1 mΩ, and "no" is written in a case where the amount of increase in the electric resistance was less than 0.1 mΩ.

Here, the electrochemical durability and the electric resistance characteristic of the secondary battery were each evaluated. In addition, a potential (V) of the negative electrode 22 and a potential (V) of the outer package can 10 were each measured with use of the secondary battery at a time point before the stabilization and after the assembly (at a time point when 12 hours had elapsed after the injection of the non-aqueous solution 30). The results thereof were as listed in Table 1. The potentials each represent a potential versus a lithium reference electrode (V vs (Li$^+$/Li)).

TABLE 1

| | Negative electrode active material layer | | Negative electrode | Electrolytic solution | | | Non-aqueous solution | | | | Potential (V vs (Li$^+$/Li)) | | | |
|---|---|---|---|---|---|---|---|---|---|---|---|---|---|---|
| | | | | | Dinitrile compound | | Dinitrile compound | | Sulfur-oxygen-bonded-group-containing compound | | | | | |
| | Kind | Mixture ratio (weight ratio) | binder Kind | Solvent Kind | Kind | Content (wt %) | Kind | Content (wt %) | Kind | Content (wt %) | Negative electrode | Outer package can | Can dissolution | Resistance increase |
| E1 | Graphite + SiO | 80:20 | PALT | Pure water | SN | <0.01 | SN | 0.01 | — | — | 3.34 | 3.36 | No | No |
| E2 | | 80:20 | PALT | Pure water | | | | 0.1 | | | 3.35 | 3.39 | No | No |
| E3 | | 80:20 | PVDF | NMP | | | | 0.01 | | | 3.36 | 3.36 | No | No |
| E4 | | 80:20 | PVDF | NMP | | | | 0.1 | | | 3.37 | 3.39 | No | No |
| E5 | | 90:10 | PVDF | NMP | | | | 0.01 | | | 3.36 | 3.36 | No | No |
| E6 | | 95:5 | PVDF | NMP | | | | 0.01 | | | 3.34 | 3.36 | No | No |
| E7 | | 100:0 | PVDF | NMP | | | | 0.01 | | | 3.30 | 3.36 | No | No |
| E8 | | 100:0 | PVDF | NMP | | | | 0.1 | | | 3.30 | 3.39 | No | No |
| E9 | | 80:20 | PVDF | NMP | | | | 0.01 | PMS | 0.01 | 3.30 | 3.34 | No | No |
| E10 | | 80:20 | PVDF | NMP | | | | 0.1 | | 0.1 | 3.28 | 3.37 | No | No |
| C1 | Graphite + SiO | 80:20 | PALT | Pure water | SN | <0.01 | SN | 0.005 | — | — | 3.34 | 3.31 | Yes | No |
| C2 | | 80:20 | PALT | Pure water | | | | 0.2 | | | 3.36 | 3.43 | No | Yes |
| C3 | | 80:20 | PVDF | NMP | | | | 0.005 | | | 3.36 | 3.33 | Yes | No |
| C4 | | 80:20 | PVDF | NMP | | | | 0.2 | | | 3.37 | 3.43 | No | Yes |

As described in Table 1, the electrochemical durability and the electric resistance characteristic of the secondary battery varied depending on a composition of the non-aqueous solution 30.

Specifically, even if the non-aqueous solution 30 was used, in a case where the content of the dinitrile compound in the non-aqueous solution 30 was less than 0.01 wt % (Comparative examples 1 and 3) and in a case where the content of the dinitrile compound in the non-aqueous solution 30 was greater than 0.1 wt % (Comparative examples 2 and 4), the outer package can 10 dissolved or the electric resistance increased. In other words, in the two cases, the following trade-off relationship was present: if the outer package can 10 did not dissolve, the electric resistance increased; or if the electric resistance did not increase, the outer package can 10 dissolved.

In contrast, in a case where the non-aqueous solution 30 was used and where the content of the dinitrile compound in the non-aqueous solution 30 was within the range from 0.01 wt % to 0.1 wt % both inclusive (Examples 1 to 10), the trade-off relationship described above was solved. Thus, the outer package can 10 did not dissolve and the electric resistance did not increase. In this case, in particular, similar tendencies were obtained without depending on each of: the composition of the negative electrode active material (the mixture ratio between the carbon material and the metal-based material); and the kind of the negative electrode binder (the kind of the polymer compound).

In particular, in the case where the content of the dinitrile compound in the non-aqueous solution 30 was within the range from 0.01 wt % to 0.1 wt % both inclusive, and if the non-aqueous solution 30 further included the sulfur-oxygen-bonded-group-containing compound, the potential of the negative electrode 22 was prevented from increasing easily, which further prevented the outer package can 10 from dissolving easily.

Based upon the results presented in Table 1, the dissolution of the outer package can 10 was suppressed and the increase in the electric resistance was also suppressed in the following case. That is, the outer package can 10 including iron contained therein the non-aqueous solution 30 together with the battery device 20. The battery device 20 included the negative electrode 22 electrically coupled to the outer package can 10 and also included the electrolytic solution 24. The negative electrode 22 included, without limitation, polyvinylidene difluoride. The non-aqueous solution 30 was disposed in the gap 11 around the battery device 20 inside the outer package can 10. The content of the dinitrile compound in the electrolytic solution 24 was less than 0.01 wt %. The content of the dinitrile compound in the non-aqueous solution 30 was greater than or equal to 0.01 wt % and less than or equal to 0.1 wt %. In such a case, accordingly, the secondary battery achieved superior electrochemical durability and a superior electric resistance characteristic.

Although the present technology has been described above with reference to one or more embodiments including Examples, the configuration of the present technology is not limited thereto, and is therefore modifiable in a variety of ways.

For example, although the description has been given of the case where the secondary battery has a battery structure of the cylindrical type, the battery structure is not particularly limited as long as the outer package can including iron is used, and the battery structure may thus be of any other type such as a prismatic type.

Further, although the description has been given of the case where the electrode reactant is lithium, the electrode reactant is not particularly limited. Thus, the electrode reactant may be another alkali metal such as sodium or potassium, or may be an alkaline earth metal such as beryllium, magnesium, or calcium, as described above. In addition, the electrode reactant may be another light metal such as aluminum.

The effects described herein are mere examples, and effects of the present technology are therefore not limited to those described herein. Accordingly, the present technology may achieve any other effect.

It should be appreciated that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A secondary battery comprising:
an outer package member including iron;
a battery device contained inside the outer package member; and
a non-aqueous solution contained inside the outer package member, wherein
the battery device includes
a positive electrode and a negative electrode that are opposed to each other and are wound, and
an electrolytic solution with which the positive electrode and the negative electrode are each impregnated,
the negative electrode is electrically coupled to the outer package member, and includes at least one selected from the group consisting of polyvinylidene difluoride, a polyacrylic acid, a polyacrylic acid salt, polyacrylonitrile, and derivatives thereof,
the non-aqueous solution is disposed in at least a portion of a space around the battery device inside the outer package member,
the electrolytic solution and the non-aqueous solution each include a dinitrile compound,
a content of the dinitrile compound in the electrolytic solution is less than 0.01 weight percent, and
a content of the dinitrile compound in the non-aqueous solution is greater than or equal to 0.01 weight percent and less than or equal to 0.1 weight percent.

2. The secondary battery according to claim 1, wherein the negative electrode includes no carboxymethyl cellulose.

3. The secondary battery according to claim 1, wherein the dinitrile compound includes at least one selected from the group consisting of malononitrile, succinonitrile, glutaronitrile, adiponitrile, sebaconitrile, phthalonitrile, and 4-hydroxyphthalonitrile.

4. The secondary battery according to claim 1, wherein
the non-aqueous solution further includes a sulfur-oxygen-bonded-group-containing compound, and
a content of the sulfur-oxygen-bonded-group-containing compound in the non-aqueous solution is greater than or equal to 0.01 weight percent and less than or equal to 0.1 weight percent.

5. The secondary battery according to claim 4, wherein the sulfur-oxygen-bonded-group-containing compound includes at least one selected from the group consisting of 1,3-propanesultone, methylpropanesultone, 1,3-propenesultone, ethylene sulfite, propargyl methanesulfonate, 1,4-butanesultone, and derivatives thereof.

6. The secondary battery according to claim 1, wherein the non-aqueous solution further includes an electrolyte salt.

7. The secondary battery according to claim 1, wherein the secondary battery comprises a lithium-ion secondary battery.

* * * * *